United States Patent Office 3,231,531
Patented Jan. 25, 1966

3,231,531
POLYVINYL CHLORIDE RESINS STABILIZED WITH A COMBINATION OF A CALCIUM SALT, ZINC SALT, A PHOSPHORUS COMPOUND, AND A SULPHATE OR SACCHARIN
Robert A. Buckley, Solon, Ohio, and Frank C. Russo, deceased, late of Parma, Ohio, by Nadine Russo, legal representative, Parma, Ohio, assignors to Ferro Corporation, Cleveland, Ohio
No Drawing. Filed Jan. 8, 1965, Ser. No. 424,434
8 Claims. (Cl. 260—23)

This is a continuation-in-part application of application Serial No. 42,492, filed July 13, 1960, and now abandoned.

This invention relates, as indicated, to heat stabilized resinous materials, and more particularly to heat stabilized vinyl chloride homopolymers which have been stabilized against deleterious effects of elevated temperatures on the color of the homopolymers by the inclusion therein of a stabilizer composition hereinafter more particularly described.

Vinyl chloride may be polymerized by free radical forming materials such as acyl or aryl peroxides at temperatures between 30° C. and about 80° C. The molecular weights obtainable by such polymerization procedures generally range from about 4,300 to about 100,000. In accordance with polymerization procedures currently commercially employed, vinyl chloride is most conveniently polymerized by emulsion polymerization techniques or by suspension polymerization techniques.

A particular and principal drawback of poly (vinyl chloride) is its relative instability to heat. Under the influence of elevated temperatures, i.e., in the range from about 300° F. to about 450° F., where these materials are usually processed there is a pronounced tendency for these materials to undergo a discoloration of the plastic body.

It is against such discoloration at elevated temperatures that the present invention is primarily directed, and there are provided in accordance with this invention both a stabilizing composition, and a stabilized poly (vinyl chloride) composition of improved resistance to the deleterious effects of exposure to elevated temperature for prolonged periods.

The essential discovery of this invention relates to the unexpected merits, as a heat stabilizer for poly (vinyl chloride), of a combination of certain calcium and zinc compounds with organic phosphites and certain sulfur-containing surface-agents (e.g. sodium lauryl sulfate).

The discovery is of particular value and interest because, despite knowledge of the performance of the individual components, past experience in the poly (vinyl chloride) stabilizer field tended strongly to direct experimental efforts away from such a four-component combination whose utility is herein described.

Thus, wherever calcium salts of carboxylic acids were useful, barium salts were generally superior. In fact, calcium salts as stabilizers are almost exclusively reserved for use in food packaging, where all reactive barium compounds are considered objectionable food contaminants, but certain compounds are not.

Similarly, where zinc salts are useful, cadmium salts are usually better, although some applications are known, in which the reverse is true. These latter applications include certain poly (vinyl chloride) formulations containing a large filler content (e.g., 100–500 parts of calcium carbonate per 100 parts of resin). Zinc compounds are useful in plastisols, and in other highly plasticized compositions, but otherwise zinc is used more commonly as a minor adjunct to cadmium compounds, where it imparts resistance to sulfur stains.

It is thus noteworthy that while calcium is much cheaper than barium, and zinc is much cheaper than cadmium, barium-cadmium stabilizers are almost universally preferred to calcium-zinc stabilizers.

This consideration is further accentuated by the possible use of phosphites together with the metal-containing stabilizer compounds. The phosphites may enhance the heat stabilization in a variety of ways known in the art. But the preferred phosphites are nearly all liquids or low-melting solids, and are preferably combined with the other ingredients into a single liquid stabilizer. For this purpose a solvent is usually added, since the phosphite itself has only limited solubility for the metal salts. However, it is well known that calcium salts of carboxylic acids are more difficult to dissolve, and tend to give more viscous liquids than do the corresponding barium compounds. Such preparations are more difficult to use in poly (vinyl chloride) processing than the thinner, clearer, less viscous stabilizers obtained with preparations of the various barium analogs.

Because of these considerations, stabilizers containing calcium and zinc compounds, and organic phosphites are virtually unknown in commercial practice, although the possibility of such combinations theoretically is derivable from published lists of potentially useful individual stabilizer ingredients.

The fourth element of the combination disclosed in this specification is a compound of a type commonly used as an emulsifying agent in emulsion polymerization of poly (vinyl chloride). The role of this emulsifying agent, which is frequently retained in appreciable concentration in a commercial polymer, is generally regarded as adverse to heat stability. Note, "La Stabilisation des Chlorures de Polyvinyle," by Fernand Chavassus et Roger de Broutelles (Les Editions Amphora, Paris, 1957) page 184, wherein it is stated that stabilizers in emulsion polymerized resins give generally worse results than the same or equivalent stabilizers in suspension polymerized resins.

It should be noted that not all emulsifying agents, useful in polymerization processes are suitable for this stabilization system. Thus, simple sodium salts (e.g., sodium stearate) may be used as an emulsifier for purposes of polymerization but do not contribute synergistically as a component of our new stabilizer, and cannot substitute for sodium lauryl sulfate. It is also to be noted that emulsion-polymerized resins may, in some cases, be washed free of the emulsifying agent. In such cases the practice of this invention requires the re-addition of the suitable surface-active agent as part of a stabilizer system. But most noteworthy is that suspension-polymerized resins, which are inherently free of such surface-active agents, benefit from the use of this four-component stabilizer system.

Briefly stated then, this invention contemplates the provision, in a plasticized homopolymer of vinyl chloride, of a stabilizing composition for plasticized homopolymers of vinyl chloride, including four essential ingredients. The first essential ingredient of the stabilizers is an alkali metal alkyl sulfate or sulfonate, such as those used in emulsion polymerization procedures as emulsifying agents for the production of poly(vinyl chloride) resins. Although other agents are useful herein as hereafter described, those of particular utility in accordance herewith are conveniently selected from the group consisting of alkali metal alkyl and alkenyl sulfates and sulfonates. The second essential ingredient is calcium present in the form of a soap, or salt, of a carboxylic acid containing from 6 to 30 carbon atoms. The third essential ingredient of the stabilizers of the present invention is zinc, present in the stabilizer as a zinc soap, or salt, of a carboxylic acid containing from 6 to 30 carbon atoms. The fourth essential ingredient of the stabilizers of the present invention is phosphorus present as an organic phosphite ester.

The stabilizers of the present invention comprise mixtures of these essential ingredients in certain proportions produced completely externally of the resin, or by addition to the resin, the relative proportions of the several ingredients being such as to provide in the final composition, calcium, exclusive of that which may be added as inorganic calcium compounds in the amount of from about 0.01 to about 0.5 parts per 100 parts of resin of calcium calculated as the metal; from about 0.01 to about 0.5 parts per 100 parts of resin of zinc calculated as the metal; from about 0.005 to about 0.5 parts per 100 parts of resin of phosphorus calculated as the metal; and from about 0.01 to about 3 parts per 100 parts of resin of an alkali metal alkyl sulfate or sulfonate. Where the homopolymer is emulsion polymerized, and by virtue thereof already contains in admixture therewith an alkali metal alkyl sulfate or sulfonate such as described, it is not necessary to add this latter ingredient as part of the stabilizer composition, although where concentrations of such agent in the homopolymer are found to be too low, such concentrations may be supplemented by inclusion of stabilizer containing an alkali metal organo-sulfate or sulfonate as a part of the stabilizer composition. It is not necesary that the whole content of sulfate or sulfonate in the final resin shall be composed of a single agent; a plurality of such agents may be present to provide the requirements of this ingredient. Likewise, in the case of the other essential ingredients, the metals calcium, zinc, and phosphorus may be provided by more than one chemical compound containing such essential element. Stabilizer compositions when included in plasticized poly(vinyl chloride) resins in an amount sufficient to supply within the body of the resin concentrations of each of the essential ingredients above mentioned within the ranges indicated are effective in inhibiting the development of undesirable coloration in poly(vinyl chloride) resins upon exposure to elevated temperatures for prolonged periods of time.

Plasticizers commonly used with poly(vinyl chloride) homopolymers are included in these compositions in the amounts normally employed as, for example, in plastisol formulations or calendered formulations. Such plasticizers are well known, the most widely used being the phthalate esters of aliphatic alcohols, e.g., dioctyl phthalate, dibutyl phthalate, etc., the aromatic phosphates, e.g., triphenyl phosphate, tricresyl phosphate, esters and polyesters of adipic acid, sebacic acid, e.g., dibutyl sebacate, epoxidized esters of mono and polyhydric alcohols, e.g., epoxidized soya bean oil, 2-ethylhexyl epoxytallate, etc. These plasticizers may be present in amounts ranging from 5 to about 200 parts per 100 parts of homopolymer.

The product of poly(vinyl chloride) homopolymers by either the emulsion polymerization technique or the suspension polymerization technique is well known to those skilled in the art. These homopolymers may be diluted to the extent of about 60% of the total resin, if desired, with various other resinous materials, such as, for example, suspension polymerized vinyl acetate-vinyl chloride copolymers containing from 1% to 15% vinyl acetate, vinylidene chloride-vinyl chloride copolymers for improving working characteristics of plastisols made therefrom. In the emulsion polymerization technique, emulsifying agents are added in order to reduce the interfacial tension between the aqueous phase and the water insoluble monomer phase sufficiently to allow easy and stable emulsification with simple agitation. Among the useful emulsifying agents are the alkali metal salts of certain aliphatic acid sulfates and sulfonates. These emulsifying agents may be either saturated or unsaturated and include the sodium, potassium, and lithium salts of $C_8$ to $C_{30}$ saturated or unsaturated sulfates or sulfonates.

The class of materials useful as the first essential ingredient includes generally, materials having the general formula:

wherein M is an alkali metal (sodium, potassium, or lithium) and R is a saturated or unsaturated organic group such as alkyl, alkenyl, aryl, aralkyl, aralkenyl, alkaryl, cycloalkyl, cycloalkenyl, alkoxyaroxy, cycloalkoxy, aralkoxy, and aralkenoxy, 1, 2 dicarboalkoxyethyl, carboxalkoxy alkali metal carboxyethyl, carboxyalkyl and metal carboxyalkyl.

The following list of examples illustrates specific compounds in accordance with the foregoing formula.

Alkyl:
  Sodium octyl sulfonate
  Potassium octodecyl sulfonate
  Sodium cetyl sulfonate Alkoxy:
  Sodium octyl sulfate
  Potassium octyl sulfate
  Lithium octyl sulfate
  Sodium nonyl sulfate
  Sodium decyl sulfate
  Sodium lauryl sulfate
  Potassium lauryl sulfate
  Lithium lauryl sulfate
  Sodium octodecyl sulfate
  Sodium heptadecyl sulfate
  Sodium cetyl sulfate Alkenyl: sodium decenyl sulfonate Alkenoxy:
  Sodium decenyl sulfate
  Sodium dodecenyl sulfate
  Sodium oleyl sulfate Aryl:
  Sodium benzene sulfonate
  Sodium B-naphthyl sulfonate Aralkyl: sodium phenethyl sulfonate
Aralkenyl: sodium 4-phenyl-2-butenyl sulfonate
Alkaryl: sodium para toluene sulfonate
Cycloalkyl: sodium cyclohexylsulfonate
Cycloalkoxy: sodium cyclohexyl sulfate
Aralkoxy: sodium phenethyl sulfate
Aralkenoxy: sodium 4-phenyl-2-butenyl sulfate
1,2 dicarboalkoxyethyl: sodium didodecylsulfosuccinate

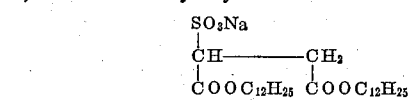

Carboalkoxy alkali metal carboxyethyl:
  disodium salt of monododecysulfosuccinic acid mixed

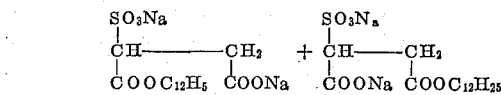

Carboalkyl:
  monosodium salt of alpha-sulfopalmitic acid

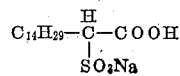

Metal carboxyalkyl
    disodium salt of alpha-sulfopalmitic acid

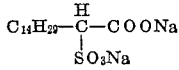

Some materials of non-emulsifying nature have been example, solubilized saccharin, e.g. saccharin sodium, saccharin potassium, and saccharin lithium which, for the purposes of stabilization are equivalent materials to the aforesaid general class of compounds. They are not, however, emulsifying agents such as used in polymerization of vinyl chloride. Alkali metal soaps or carboxylic acids which are sometimes used as emulsifying agents in vinyl chloride polymerization procedures, e.g., sodium stearate, are not useful herein as the first essential ingredient; that is, emulsion polymerized vinyl chloride using sodium stearate as the anionic emulsifying agent may be stabilized in accordance herewith by admixing therewith a stabilizer containing all four essential ingredients hereof since the first essential ingredient as herein defined would otherwise be absent. Non-ionic emulsifying agents sometimes used in vinyl chloride emulsion polymerization procedures likewise do not suffice in providing within the resin body an ingredient capable of serving the capacity of the first essential ingredient thereof. In addition to the above specific examples of emulsifying agents employed herein and covered by the foregoing formula other materials suitable for use include the following: sodium capryl sulfate, sodium 2-ethylhexyl sulfate, potassium decenyl sulfate, sodium benzyl sulfate, sodium (naphthalene-formaldehyde) sulfonate, sodium p-octyl benzene sulfonate, sodium p-octylphenyl sulfate, sodium phenyloleyl sulfonate, sodium phenylricinoleyl sulfate, and numerous other alkali metal organic sulfates and sulfonates, wherein the organic group is saturated or unsaturated hydrocarbon. Of course, one or more substituent groups such as keto, ether, halogen, nitro, hydroxy, etc. may be present in the organic group provided they do not color the compound to a degree sufficient to be noticed with objection in the stabilized resin.

Where the homopolymers are polymerized following the emulsion polymerization technique, sufficient of the anionic emulsifying agent, such as one of those mentioned above, is occluded with the polymer particle to satisfy the requirements of this ingredient in the stabilizer compositions of the present invention. While not usually necessary, as experience has shown, additional amounts of the same or different anionic emulsifying agent may be added to the emulsion polymerized homopolymer if desired. Reference may be had to Patent No. 2,934,529 for suitable procedures for producing emulsifying agent containing poly (vinyl chloride) resins useful herein.

In the case of the suspension polymerized homopolymers of vinyl chloride, no emulsifying agent is employed in their preparation, and hence, the stabilizers of the present invention must include in their composition, for use in connection with such homopolymers, an alkali metal sulfate or sulfonate in the amount indicated above. Thus, any of the anionic emulsifying agents mentioned above, or the equivalents or analogs of such which will become readily apparent to those skilled in the art as belonging within the class of sulfates and sulfonates above noted may be included in the stabilizer compositions of the present invention for intimate admixture with such suspension polymerized homopolymers, in an amount sufficient to provide when included therein from 0.01 to 3 parts by weight per 100 parts of poly (vinyl chloride) resin.

The second essential ingredient of the stabilizer composition of the present invention is calcium which is included in the homopolymer in the form of a soap or salt of an aliphatic carboxylic acid containing from 6 to 30 carbon atoms. The nature of the carboxylic acid radical in these calcium soaps is of negligible importance, the primary consideration being the introduction of calcium into the vinyl resin in a form which is dispersible in such resin. Thus, the carboxylic acids from which the calcium salts are produced may be aliphatic, cyloaliphatic, or aromatic in principal structure. One or more carboxylic acid groups may be present in the molecule of the carboxylic acid thus employed. Substituent goups, such as for example hydroxyl, chloro, nitro, epoxy, keto, and the like may be present in the molecules of such acids without adversely affecting the principal objective, namely, the inclusion of calcium in the vinyl resin. Thus, there may be employed calcium hexoate, calcium 2-ethyl hexoate, calcium octoate, calcium benzoate, calcium hexahydro benzoate, calcium stearate, calcium 9-hydroxy stearate, calcium naphthenate, calcium abietate, calcium tallate, calcium phthalate, calcium adipate, calium 9,10-dichlorostearate, etc. As indicated above, the amount of such soap or mixture of soaps employed in the stabilizing compositions of the present invention is such as to provide when included therein from about 0.01 to about 0.5 part per 100 parts of resin of calcium calculated as the metal in the resin exclusive of calcium introduced as inorganic calcium compounds.

The third essential ingredient of the compositions of the present invention is zinc which is present in the stabilizing compositions and in the stabilized vinyl chloride homopolymers as a zinc salt or soap of a carboxylic acid containing from about 6 to about 30 carbon atoms. As in the case of the calcium salt of a carboxylic acid as described above, the organic portion of the molecule of the zinc salt is not critical and it may also be aliphatic, cycloaliphatic, or aromatic in nature, or any combination of these; it may contain one or more carboxylic acid groups, and substituent groups such as may be present in the case of the calcium salt may also be present in the case of a zinc salt. Specific examples of zinc carboxylates useful in accordance with the present invention may be obtained by replacing the calcium in the preceding specific examples with zinc thus, zinc hexoate, zinc 2-ethylhexoate, zinc caprylate, zinc laurate, zinc stearate, zinc oleate, zinc benzoate, zinc phthalate, zinc naphthenate, zinc naphthoate, etc. are a few typical examples of zinc carboxylates which may be used in accordance with the present invention, it being understood that numerous other zinc salts or soaps will become readily apparent to those skilled in the art.

Zinc and calcium salts of salicyclic acid are included within the scope of this invention. While in the case of zinc salicylate, the chelation of the zinc reduces its efficiency per unit of metal, the compound still manifests useful activity, and may be used as a satisfactory component in this invention. As indicated above, zinc, calculated as the metal, is present in the stabilized compositions of the present invention in amounts ranging from about 0.01 to about 0.5 part per 100 parts of resin, and is present in the stabilizer composition in an amount sufficient to provide a concentration aforesaid when included therein.

The fourth essential ingredient of the compositions of the present invention is, as indicated above, an organic phosphite ester. These phosphites have the general formula:

wherein $R_1$ and $R_2$ are each selected from the group consisting of aryl, alkyl, cycloalkyl, alkaryl, aralkyl, alkoxyaryl, alkoxyalkyl, aroxyalkyl and alkoxycycloalkyl radicals containing at least 5 carbon atoms and mono OH substituted variants of foregoing, R is selected from the group consisting of hydrogen and $R_1$ and $R_2$ radicals. The neutral or trisubstituted phosphites are preferred. While this broad class of organic phosphites shows effectiveness for the purposes of the present invention, it has been found that those organic phosphites which are characterized by the presence of an aryl nucleus having a carbon atom thereof indirectly attached to the phosphorus atom through an oxygen atom are particularly effective, especially the monoalkyl diaryl phosphites and dialkyl monoaryl phosphites. Reaction products of chemically equivalent amounts of phenol sulfides with $PCl_3$ may also be used.

Specific illustrative examples of the class of organic phosphites contemplated for use in accordance with the above general formula are as follows:

$$R_1 = R_2 = R$$

Aryl: Triphenyl phosphite
Alkyl: Triisoamyl phosphite
Cycloalkyl: Tricyclohexyl phosphite
Alkaryl: Tri p-cresyl phosphite
Aralkyl: Triphenethyl phosphite
Alkoxyaryl: Tri p-methoxyphenyl phosphite
Alkoxyalkyl: triethoxyhexyl phosphite
Aroxyalkyl: tri( beta-phenoxy ethyl) phosphite
Alkoxycycloalkyl: Tri (2-ethoxycyclohexyl) phosphite
$R=H$, $R_1=R_2=$aryl: diphenyl phosphite
R is OH-substituted variants of foregoing: tri (12-hydroxystearyl) phosphite Other examples of phosphites which may also be employed in this invention are the following:

Tribenzyl phosphite
Trinaphthyl phosphite
Tris (p-ethylphenyl) phosphite
Tris (o-iso-propylphenyl) phosphite
Tris (p-tert.-butylphenyl) phosphite
Tris (p-tert.-amylphenyl) phosphite
Tris (p-cyclohexylphenyl) phosphite
Tris (p-2-ethylhexylphenyl) phosphite
Tris (p-n-octylphenyl) phosphite
Tris (p-1,1,3,3-tetramethylbutylphenyl) phosphite
Diphenyl monoisooctyl phosphite
Tris (p-nonylphenyl) phosphite
Tris (p-laurylphenyl) phosphite
Trihexyl phosphite
Tris (methylcyclohexyl) phosphite
Tris (2-ethylhexyl) phosphite
Tricapryl phosphite
Tridecyl phosphite
Tridodecyl phosphite
Tris (phenyl ethyl) phosphite
Tris (p-hydroxyphenyl iso-propylidene phenyl) phosphite
Monophenyl didodecyl phosphite
Monophenyl dicapryl phosphite
Diphenyl phosphite
Dicresyl phosphite
Dicapryl phosphite
Dicyclohexyl phosphite
Dilauryl phosphite
Bis (tert.-butylphenyl) phosphite
Bis (methoxyphenyl) phosphite From all of the foregoing specific examples, those skilled in the art will obtain sufficient information to enable them to arrive at tri- or di-substituted organic phosphites other than those specifically mentioned which will be found useful in accordance with the present invention. In general, so long as the phosphite contains at least 5 carbon atoms in each organic substituent radical and there are at least 2 substituent radicals, compatibility and boiling point of the phosphite are sufficient for the purposes of the present invention. The useful phosphites may be made by reacting $PCl_3$ with a hydroxy compound in the ratio of 1 mole $PCl_3$ to 2 or more moles of —OH in a mono- or polyhydric alcohol or phenol. Substituent groups other than those specifically illustrated in the foregoing listing of specific examples, may be present, although it is desired that no color be imparted by this particular additive since it is a desired objective to maintain the color as nearly constant as possible in these poly (vinyl chloride) containing compositions. Hydroxy substituents in the alkyl, aryl, or cycloalkyl radicals may be tolerated so long as compatibility can be maintained. The presence of ether, thioether, or ester groups in the alkyl or aryl substitutents likewise does not seem to interfere with the operability of these compounds. As in the case of the calcium and zinc, it is the presence of trivalent phosphorus in these compositions which is of importance, more so than the nature of the organic radical to which the phosphorus is indirectly attached through oxygen. Thus, as in the case of calcium and zinc, the amount of phosphorus is calculated in terms of the metal and ranges from about 0.005 to about 0.5 part per 100 parts of the homopolymer.

As indicated above, the stabilizers of this invention including the three of four essential ingredients, as the case may be depending upon whether the resin is emulsion polymerized or suspension polymerized, is employed in amounts sufficient to provide the indicated concentrations of the essential ingredients. The stabilizer compositions as concentrates with or without diluents, extenders, pigments, plasticizers, etc., may be incorporated in the poly (vinyl chloride) resins in amounts ranging from 0.5 to 10 parts per 100 parts of resin by the usual method of incorporating such stabilizer composition therein. Other ingredients may of course, be present in the composition of this invention such as, for example, pigments, such as titanium dioxide, fillers and extenders such as calcium carbonate, diluents, etc. Auxiliary stabilizer compositions, such as epoxy compounds, barium-cadmium or lead salts as well as light stabilizers, such as the hydroxy-substituted benzophenones, etc. may also be included in the amounts in which these ingredients are normally included in plastic formulations.

It becomes convenient at this point to illustrate the present invention by giving specific examples of stabilizers in accordance herewith and vinyl chloride homopolymers stabilized therewith. It is to be understood that these examples are for illustrative purposes only and are not to be construed as limiting the scope of the invention thereto. Those skilled in the art will be enabled with an understanding of these specific examples to formulate innumerable other materials within the teachings of this invention without departing from the principles thereof.

In order to illustrate the importance of the sulfate or sulfonate component in the compositions of the present invention, a series of tests were run using a variety of stabilizers. In one series of tests an emulsifying agent, present in the poly (vinyl chloride) resin as commercially available was removed by repeated water washing, and in another series this agent was retained.

The basic formulation in each case was as follows:

| | Parts |
|---|---|
| Poly (vinyl chloride) resin washed or unwashed | 100 |
| Di-(2-ethylhexyl) phthalate | 70 |
| Epoxidized soya bean oil | 5 |
| Stabilizer. | |

The compositions thus formulated were mixed, poured into patties and heated at 365° F. in a forced circulation oven. Samples were removed periodically and the color was recorded.

*Example 1*

*Stabilizer A* (Ba-Cd).—This stabilizer was used in the above formulations at 0.25 part per 100 parts of resin of barium naphthenate, and 0.08 part per 100 parts of resin (phr.) of cadmium 2-ethyl hexoate. In unwashed resin formulations containing 0.5–0.6 part per 100 parts of resin of emulsifier believed to be the sodium salts of mixed mono- and di-dodecylsulfosuccinic acids, the sample had a light brown opaque appearance at 15 minutes' exposure in the oven and was dark brown at 30 minutes. In the washed resin containing no emulsifier, the sample was clear, undiscolored at 15 minutes, clear yellow at 45 minutes, and very dark red to black at 90 minutes. Thus, the presence of the emulsifier was detrimental in a typical barium-cadmium stabilizer system.

Example 2

*Stabilizer B* (Ba-Zn).—In this case, the stabilizer was composed of 0.34–0.55 part per 100 parts of resin of barium naphthenate and 0.15–0.25 part per 100 parts of resin of zinc 2-ethyl hexoate. In both washed and unwashed resin formulations, the former containing no emulsifier and the latter containing 0.5–0.6 part per 100 parts of resin of sodium salts of mono- and di-dodecyl-sulfosuccinic acid emulsifier, all samples were black at 45 minutes. Thus the emulsifier did not noticeably improve the Ba-Zn, stabilized system.

Example 3

*Stabilizer C* (Ca-Zn-P).—The active ingredients of this stabilizer composition was a 75%–25% mixture of calcium and zinc naphthenate to which was added triphenyl phosphite equal in weight to about ⅓ of the combined weight of the calcium and zinc salts. The combination stabilizer was used at 0.90 part per 100 parts resin. With the washed resin containing no emulsifier, the samples were light yellow at 45 minutes, and brown to black at 60 minutes. In the unwashed resin having about 0.5 to 0.6 part per 100 parts of resin of sodium salts of mixed mono- and di-dodecylsulfosuccinic acid emulsifier, the samples were discolored at 45 minutes, pale yellow at 60 minutes and an amber color at 90 minutes, which was lighter in color than the washed resin was at 60 minutes. Thus, in the Stabilizer C system, the effect of the emulsifier is distinctly favorable.

Example 4

*Stabilizer D* (Ca-Zn-P).—This stabilizer was identical with Stabilizer C except that the ratio of calcium to zinc naphthenate was changed to 60:40. The stabilizer concentration was again 0.90 part per 100 parts resin. In the washed resin having no emulsifier, the sample was black at 45 minutes. In the unwashed resin containing about 0.5 to 0.6 part per 100 parts resin of sodium salts of mixed mono- and di-dodecylsulfosuccinic acid emulsifier, the sample was a pale yellow at 90 minutes. Here again the value of the emulsifier is dramatically shown for the calcium-zinc-phosphorus system.

To determine whether these results were generally applicable to formulations containing coloring and opacifying agents, the formulation given above was modified to include the addition of 20 parts of calcium carbonate as an extender, and 5 parts of titanium dioxide. Using only the unwashed resin, of Examples 1–4 the following observations were made.

Example 5

*Stabilizer B* (Ba-Zn).—This stabilizer at a concentration of 0.5 part per 100 parts of resin yielded samples which were slightly discolored at 30 minutes, brown at 60 minutes, and dark brown at 75 minutes. Higher concentrations of this stabilizer would not effectively delay the onset of the dark brown coloration.

Example 6

*Stabilizer C* (Ca-Zn-P).—At concentrations of 0.90 part per 100 parts of resin, the samples were slightly discolored at 30 minutes, but only pale tan at 60 minutes, and a light tan at 75 minutes.

Example 7

*Stabilizer D* (Ca-Zn-P).—At a concentration of 0.90 part per 100 parts of resin, the samples showed no discoloration at 60 minutes, and only a pale tan color at 75 minutes.

Thus, the calcium-zinc-phosphorus stabilizer system appeared to function well in the presence of emulsifier in filled formulations.

These results are applicable to calendered formulations where emulsifier free suspension polymerized resins are used. The general formulation utilized in the following examples is as follows:

| | Parts |
|---|---|
| Poly (vinyl chloride) resin suspension polymerized | 100 |
| Di-(2-ethyl hexyl) phthalate | 40 |
| Epoxidized soya bean oil | 5 |
| Calcium carbonate | 25 |
| Titanium dioxide | 5 |
| Stabilizer. | |

The ingredients of the above formulation were milled for 5 minutes at 320° F. on a two-roll steam-heated mill. Test plaques cut from the milled sheets were heated in the oven at 365° F., with the results noted for the various stabilizers in the following examples.

Example 8

*Stabilizer B* (Ba-Zn).—This barium-zinc stabilizer used at 1.0 part per 100 parts of resin gave a product which upon heating in the oven was pale tan at 60 minutes. When 1.0 part per 100 parts of resin of sodium lauryl sulfate was added, the product showed a pink discoloration at 60 minutes.

Example 9

*Stabilizer C* (Ca-Zn-P).—The calcium-zinc-phosphorus stabilizer composition of the present invention used at a concentration of 1.2 parts per 100 parts of resin gave a brown colored product at 60 minutes. However, when the stabilizer composition of the present invention was completed by the inclusion of 1.0 part per 100 parts of resin of the emulsifier, sodium lauryl sulfate, the product showed no discoloration at 60 minutes, and was only light tan at 90 minutes.

Example 10

The formulation of Example 3 above, omitting the phosphite from Stabilizer C and employing unwashed resin was tested. The product was grossly discolored at 20 minutes and black at 40 minutes. Thus, the presence of the organic phosphite ester to the stabilizers of the present invention is essential.

As indicated above, the stabilizer compositions of the present invention are generally formulated on the basis of providing calcium and zinc in concentrations expressed in terms of the metal. A suitable stabilizer formulation in these terms then, would have the following composition:

Example 11

In order to illustrate the unexpectedly useful and efficacious character of the 4-component stabilizer system of this invention, a series of tests were run in which each if the components was tested singly, in all possible two- and three-component compositions. To preclude invalidation of the comparison by virtue of varying total amounts of stabilizer, these total amounts were kept constant. To preclude effects of varying ratios of stabilizer components, the ratio of the components present in multi-component systems was kept constant and equal to that present in the four-component system. The constancy of these ratios and total amounts is evident from the illustration.

The stabilizers were included at the stated concentrations in a mixture as follows:

| | Parts |
|---|---|
| Poly (vinyl chloride) homopolymer | 100 |
| Di-(2-ethyl hexyl) phthalate | 40 |
| Epoxidized soya bean oil | 5 |
| Calcium carbonate | 25 |
| Titanium dioxide | 5 |
| Stabilizer. | |

This formulation is suitable for a flexible white polyvinyl chloride about typical of a variety of commonly used commercial products.

The mixture was milled on a heated two-roll mill for 5 minutes at 320° F., in a uniformly heated forced convection oven. The samples were mounted on a continually rotating tray to assure that all samples had identical heat histories. Small samples were removed at 15 minute intervals and their colors compared.

thinking away from the invention herein described and claimed is illustrated by the comparison in this example of calcium-zinc, calcium-cadmium, barium-zinc and bari-

TABLE I

| | Stabilizer Composition (phr.[1]) | | | | Total Stabilizer | Color after varying the time of oven exposure | | |
|---|---|---|---|---|---|---|---|---|
| | Calcium [2] naphthenate | Zinc [2] naphthenate | Triphenyl phosphite | Sodium Lauryl Sulfate | | 0 Minutes | 45 Minutes | 105 Minutes |
| 1 | 2.3 | | | | 2.3 | White | Med. Brown | Brown. |
| 2 | | 2.3 | | | 2.3 | ----do---- | Dark Brown | Dark Brown. |
| 3 | | | 2.3 | | 2.3 | Pinkish White | Tan | Tan-Brown. |
| 4 | | | | 2.3 | 2.3 | White | Dark tan | Do. |
| 5 | 1.7 | 0.6 | | | 2.3 | ----do---- | Cream | Brown. |
| 6 | 1.4 | | 0.9 | | 2.3 | Pinkish White | Med. Brown | Med. Brown. |
| 7 | 0.9 | | | 1.4 | 2.3 | White | Tan | Tan-Brown. |
| 8 | | 0.7 | 1.6 | | 2.3 | ----do---- | Dark Brown | Dark Brown. |
| 9 | | 0.4 | | 1.9 | 2.3 | ----do---- | Med. Brown | Med. Brown. |
| 10 | | | 0.7 | 1.6 | 2.3 | Pinkish White | Tan | Dark Tan. |
| 11 | 1.1 | 0.4 | 0.8 | | 2.3 | White | Cream | Med. Brown. |
| 12 | 0.75 | 0.25 | | 1.3 | 2.3 | ----do---- | ----do---- | Do. |
| 13 | | 0.3 | 0.6 | 1.4 | 2.3 | Pinkish White | Brown | Do. |
| 14 | 0.7 | | 0.5 | 1.1 | 2.3 | White | Pink-Tan | Dark Tan. |
| 15 | 0.66 | 0.23 | 0.44 | 1.0 | 2.3 | ----do---- | White | Cream. |

[1] Parts per hundred of resin.
[2] Calculated as the compound although added as a solution in an inert solvent (about 50-60% concentration).

From these tests it is apparent that the use of any 1-, 2-, or 3-compound subset of the 4-component system of this invention does not, at equal total stabilizer concentration, provide equal stabilization to the 4-component system, illustrated in test #15 of Table I.

*Example 12*

In order to verify that the favorable results of Example 11 did not simply reflect the effects of excessive quantities of the individual ingredients, the entire series was repeated using the same formulations as in Example 11, except that now the stabilizer components were always used at the same concentrations, the systems with more components having consequently more total stabilizers. If the contribution of 1, 2, or 3 components in the applicant's four-component system were responsible for stabilization, and the fourth was ineffective, we should expect to see some of the subsystems at least equal to the preferred four-component system. However, as shown in Table II below, this is not the case.

um-cadmium stabilizer systems. It should be noted that calcium and barium are known to contribute to "long term" heat stability, i.e., to the minimization of color development after prolonged heat exposure. Cadmium and zinc contribute to "good early color," i.e., to the minimization of color development during the early stages of heating. Therefore, the stabilizer system would include Ba and Cd (i.e., one long term component and one early color component), and could not ordinarily include metal combinations such as Cd-Zn or Ba-Ca.

The general formulation employed in the following tests is as follows:

| | Parts |
|---|---|
| Poly (vinyl chloride) homopolymer suspension polymerized free of emulsifier | 100 |
| Di (2-ethyl hexyl) phthalate | 40 |
| Epoxidized soya bean oil | 5 |
| Calcium carbonate | 25 |
| Titanium dioxide | 5 |
| Stabilizer. | |

TABLE II

| No. | Stabilizer Composition (phr.[1]) | | | | Color after varying time of oven exposure | | |
|---|---|---|---|---|---|---|---|
| | Calcium [2] naphthenate | Zinc [2] naphthenate | Triphenyl phosphite | Sodium Lauryl Sulfate | 0 Minutes | 45 Minutes | 105 Minutes |
| 0 | | | | | White | Tan | Brown. |
| 1 | 0.66 | | | | Pink-White | Brown | Dark Brown. |
| 2 | | 0.23 | | | White | ----do---- | Do. |
| 3 | | | 0.44 | | Pink-White | Tan | Brown. |
| 4 | | | | 1.0 | White | Light Brown | Do. |
| 5 | 0.66 | 0.23 | | | ----do---- | Cream | Do. |
| 6 | 0.66 | | 0.44 | | Pink-White | Brown | Dark Brown. |
| 7 | 0.66 | | | 1.0 | White | Tan | Do. |
| 8 | | 0.23 | 0.44 | | ----do---- | Cream | Do. |
| 9 | | 0.23 | | 1.0 | ----do---- | Tan | Do. |
| 10 | | | 0.44 | 1.0 | Pink-White | Orange-Tan | Brown. |
| 11 | 0.66 | 0.23 | 0.44 | | White | Cream | Dark Brown. |
| 12 | 0.66 | 0.23 | | 1.0 | ----do---- | ----do---- | Do. |
| 13 | 0.66 | | 0.44 | 1.0 | ----do---- | Tan | Brown. |
| 14 | | 0.23 | 0.44 | 1.0 | ----do---- | ----do---- | Dark Brown. |
| 15 | 0.66 | 0.23 | 0.44 | 1.0 | ----do---- | White | Cream. |

See footnotes, Table I.

From Table II it is therefore evident that the performance of the four-component system is not duplicated by a 1-, 2-, or 3-component combination. All four components are required.

*Example 13*

The way in which the prior art on the use of metal salt stabilizers with or without phosphites tended to direct The above components were milled for five minutes at 320° F. on a two-roll heated mill. The milled sheets were then oven-aged at 365° F., with samples removed every 15 minutes and the color observed. The samples in each of the four groups described below were oven-aged simultaneously in the same oven and therefore the colors are directly comparable.

TABLE III.—COLOR OF OVEN SAMPLES

| Time | 0.73 Ca stearate +0.31 Zn stearate | 0.73 Ba stearate 0.31 Zn stearate | 0.73 Ca stearate 0.31 Cd stearate | 0.73 Ba stearate 0.31 Cd stearate |
|---|---|---|---|---|
| 0 min | White | White | White | White. |
| 30 min | Tan | Off-white | Dark Tan | Cream. |
| 75 min | Dark Brown | Dark Brown | Dark Brown | Tan. |
| 105 min | ----do---- | ----do---- | ----do---- | Light Brown. |

This illustrates the superiority of the Ba-Cd system, and total inferiority of systems with Ca instead of Ba.

The next set of samples shows the effect of the presence of 0.44 part of triphenyl phosphite, the compositions being otherwise identical with Table III.

TABLE IV.—COLOR OF OVEN SAMPLES

| Time | 0.73 Ca stearate 0.31 Zn stearate 0.44 triphenyl phosphite | 0.73 Ba stearate 0.31 Zn stearate 0.44 Triphenyl phosphite | 0.73 Ca stearate 0.31 Cd stearate 0.44 Triphenyl phosphite | 0.73 Ba stearate 0.31 Cd stearate 0.44 Triphenyl phosphite |
|---|---|---|---|---|
| 0 min | White | White | White | White. |
| 30 min | Off-White | Off-White | Light Tan | Off-White. |
| 75 min | Grey-brown | Light yellow-tan | Dark Tan | Light Tan. |
| 105 min | Dark Brown | Dark Brown | Brown | Tan. |

The conclusions of these data show the efficacy of triphenyl phosphite, but the relative superiority of Ba-Cd over other metal combinations is still evident, and the inferiority of the Ca-containing systems is confirmed.

Using the system of Table III above, but employing a commercial poly(vinyl chloride) homopolymer containing approximately 0.5% of an emulsifying agent, which an analysis for sodium and sulfate is believed to be the disodium salt of monododecylsulfosuccinic acid, we see immediately in Table V below the effects of the emulsifier.

TABLE V.—COLOR OF OVEN SAMPLES

| Time | 0.73 Ca stearate 0.31 Zn stearate | 0.73 Ba stearate 0.31 Zn stearate | 0.73 Ca stearate 0.31 Cd stearate | 0.73 Ba stearate 0.31 Cd stearate |
|---|---|---|---|---|
| 0 min | White | White | White | White. |
| 30 min | Tan | Tan | Dark Tan | Dark Tan. |
| 74 min | Brown | Brown | Brown | Brown. |
| 105 min | Dark Brown | Dark Brown | Dark Brown | Dark Brown. |

The emulsifier has a detrimental effect most pronounced in the hitherto preferred Ba-Cd system; it makes no notable contribution to heat stability in any of the observed cases.

By contrast, the 4-component systems not only exhibit improved heat stability but, wholly unexpected, show the Ca-Zn system to be considerably better in color at all periods of the oven-aging test. Here the resin stabilized in Table V is employed and the metal soaps and phosphites are identical with those set forth in Table IV, and the emulsifier as in Table V.

TABLE VI.—COLOR OF OVEN SAMPLES

| Time | Ca-Zn-P | Ba-Zn-P | Ca-Cd-P | Ba-Cd-P |
|---|---|---|---|---|
| 0 min | White | White | White | White. |
| 30 min | ----do---- | Off-White | Cream | Cream. |
| 75 min | Light Tan | Tan | Tan | Dark Tan. |
| 105 min | Tan | Brown | Dark Brown | Dark Brown. |

It is clear that the Ca, Zn, P system in the presence of an emulsifier shows vastly superior heat stability than the other above systems.

*Example 14*

A typical basis for constructing a stabilizer is the following partial compition:

| | Percent |
|---|---|
| Calcium | 2.25 |
| Zinc | 1.7 |
| Triphenyl phosphite | 15.0 |
| Sodium | 1.4 |

It is to be noted that the calcium, zinc and sodium are present in any of the various forms mentioned above, or the equivalent of such, for the aforementioned first three essential ingredients. The phosphite ingredient may be replaced by any of those mentioned above, or the equivalent. Usually, from 1 to 4 parts of stabilizer are used with the average level at about 2 parts per 100 parts of vinyl resin, by weight.

Specific examples of stabilizers include the following derived from the partial formulation of Example 14, with variation within the scope of the invention:

*Example 15*

| | Parts by weight |
|---|---|
| Calcium octoate | 20 |
| Zinc octoate | 9 |
| Triphenyl phosphite | 15 |
| Sodium lauryl sulfate | 15 |

This stabilizer composition may be used in amounts sufficient to provide the aforementioned metal concentrations in the vinyl resins, this particular composition being especially useful in the range of from 0.6 to 3.0 parts per 100 parts of solution or suspension polymerized, plasticized vinyl chloride homopolymer.

*Example 16*

| | Parts by weight |
|---|---|
| Calcium naphthenate | 35 |
| Zinc naphthenate | 15 |
| Diphenyl monoisooctyl phosphite | 15 |
| Sodium lauryl sulfate | 15 |

This stabilizer composition may also be used in the same manner as Example 12.

*Example 17*

| | Parts by weight |
|---|---|
| Calcium butylbenzoate | 20 |
| Zinc octoate | 9 |
| Tris (2-ethylhexyl) phosphite | 15 |
| Potassium oleyl sulfonate | 15 |

This stabilizer composition may be used in the same manner as Example 12.

*Example 18*

| | Parts by weight |
|---|---|
| Calcium octoate | 20 |
| Zinc octoate | 9 |
| Triphenyl phosphite | 15 |

This stabilizer composition is used in emulsion polymerized, plasticized vinyl chloride formulation in an amount sufficient to provide the various metals, calcium, zinc and phosphorus, in the amounts indicated above. This stabilizer composition is especially useful in the range of 1 to 5 parts per 100 parts of emulsion polymerized vinyl chloride resin.

*Example 19*

| | Parts by weight |
|---|---|
| Calcium octoate | 25 |
| Zinc naphthenate | 10 |
| Tri-cresyl phosphite | 15 |
| Sodium saccharine | 25 |

This stabilizer is used in the same manner as Example 12, and illustrates the use of a solubilized saccharine compound which is equivalent to the sulfates and sulfonates as above described.

*Example 20*

| | Parts by weight |
|---|---|
| Calcium p-octylphenate | 20 |
| Zinc octoate | 10 |
| Triphenyl phosphite | 15 |
| Sodium alpha-sulfopalmitate | 25 |

This stabilizer is used in the same manner as Example 12, and illustrates the use of an alpha-sulfocarboxylate which is also an operative example of the sulfonate type compounds useful as the first essential ingredient. Calcium phenates may be used in place of the $C_6$–$C_{30}$ carboxylates above mentioned as the equivalents thereof.

In utilizing these stabilizer compositions, they may be added as above formulated and intimately admixed as by calendering procedures, or they may be diluted with a diluent, such as, an aliphatic hydrocarbon diluent, e.g. mineral spirits, for addition to plastisol formulations. For example, a stabilizer composition suitable for use in a plastisol formulation is as follows:

*Example 21*

| | Parts by weight |
|---|---|
| Calcium ocotate | 20 |
| Zinc octoate | 9 |
| Triphenyl phosphite | 15 |
| Mineral spirits | 41 |

This stabilizer is useful in plastisols formulated with emulsion polymerized vinyl chloride homopolymer. Usually from 1 to 5 parts by weight, e.g., 2 parts by weight are used per 100 parts by weight of poly (vinyl chloride) in the plastisol. Use of a diluent of this type promotes dispersion of the stabilizer in the resin formulation.

Thus, there has been provided a heat stabilizer for vinyl resins which depends upon the presence, in organic structure, of (a) the bivalent=$SO_2$ group and the M—O-group, where M is an alkali metal, (b) calcium, (c) zinc, and (d) trivalent phosphorus, and a heat stabilized vinyl chloride resin containing such ingredients in predetermined concentration.

Other modes of applying the principle of this invention may be employed instead of these specifically set forth above, changes being made as regards the details herein disclosed provided the elements set forth in any of the following, or the equivalent of such be employed.

It is, therefore, particularly pointed out and distinctly claimed as the invention:

1. A heat stabilized plasticized vinyl chloride homopolymer resin containing in intimate admixture therewith (a) from about 0.01 to 3 parts per 100 parts resin of an alkali metal salt of material having the general formula:

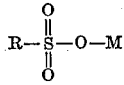

wherein M is an alkali metal, and R is selected from the group consisting of alkyl, alkenyl, aryl, arylalkyl, aralkenyl, alkyaryl, cycloalkyl, cycloalkenyl, alkoxy, aroxy, cycloalkoxy, alkaroxy, aralkoxy, aralkenoxy, 1,2-dicarboalkoxethyl, carboalkoxy alkali metal carboxyethyl carboxyalkyl and metal carboxyalkyl; (b) from about 0.01 to about 0.5 part per 100 parts resin of calcium calculated as the metal and included as a calcium salt of an organic monocarboxylic acid of 6–30 carbon atoms; (c) from about 0.01 to about 0.5 part per 100 parts resin of zinc calculated as the metal and included as a zinc salt of an organic monocarboxylic acid of 6–30 carbon atoms; and (d) from about 0.005 to about 0.5 part per 100 parts resin of phosphorus calculated as the metal and included as an organic phosphite ester having the general formula:

wherein $R_1$ and $R_2$ are each selected from the group consisting of aryl, alkyl, cycloalkyl, alkaryl, aralkyl, alkoxyalkyl, aroxyalkyl and alkoxycycloalkyl radicals containing at least 5 carbon atoms, R is selected from the group consisting of hydrogen and $R_1$ and $R_2$ radicals.

2. A plasticized polyvinyl chloride homopolymer resin containing in intimate admixture therewith (a) from about 0.01 to about 3 parts per 100 parts resin of an alkali metal solubilized saccharine, (b) from about 0.01 to about 0.5 part per 100 parts resin of calcium calculated as the metal and included as a calcium salt of an organic monocarboxylic acid of 6–30 carbon atoms, (c) from about 0.01 to 0.5 part per 100 parts resin of zinc calculated as the metal and included as a zinc salt of an organic monocarboxylic acid of 6–30 carbon atoms and (d) from about 0.005 to about 0.5 part per 100 parts of resin of phosphorus calculated as the metal and included as an organic phosphite ester having the general formula:

wherein $R_1$ and $R_2$ are each selected from the group consisting of aryl, alkyl, cycloalkyl, alkaryl, aralkyl, alkoxyaryl, alkoxyalkyl, aroxyalkyl and alkoxycycloalkyl radicals containing at least 5 carbon atoms, R is selected from the group consisting of hydrogen and $R_1$ and $R_2$ radicals.

3. A plasticized polyvinyl chloride homopolymer in accordance with claim 2 wherein the alkali metal solubilized saacharine is a sodium solubilized saccharine.

4. A plasticized polyvinyl chloride homopolymer resin containing in initimate admixture therewith (a) from about 0.01 to about 3 parts per 100 parts resin of an alkali metal salt of an alpha-sulfocarboxylic acid (b) from about 0.01 to about 0.5 part per 100 parts resin of calcium calculated as the metal and included as a calcium salt of an organic monocarboxylic acid (c) from about 0.01 to about 0.5 part per 100 parts resin of zinc calculated as the metal and included as a zinc salt of an organic monocarboxylic acid containing 6–30 carbon atoms and (d) from about 0.005 to about 0.5 part per 100 parts resin of phosphorus calculated as the metal and included as an organic phosphite ester having the general formula:

wherein $R_1$ and $R_2$ are each selected from the group consisting of aryl, alkyl, cycloalkyl, alkaryl, aralkyl, alkoxyaryl, alkoxyalkyl, aroxyalkyl and alkoxycycloalkyl radicals containing at least 5 carbon atoms, R is selected from the group consisting of hydrogen and $R_1$ and $R_2$ radicals.

5. A heat stabilized plasticized vinyl chloride homopolymer resin containing an intimate admixture therewith (a) from about 0.1 to about 3 parts per 100 parts resin of an alkali metal alkyl sulfate, (b) about 0.01 to 0.5 part per 100 parts resin of calcium calculated as the metal and included as a calcium salt of an organic monocarboxylic acid having 6 to 30 carbon atoms, (c) about 0.01 to about 0.5 part per 100 parts resin of zinc calculated as the metal and included as a zinc salt of an organic monocarboxylic acid having 6 to 30 carbon atoms, and (d) about 0.005 to 0.5 part per 100 parts resin of phosphorus calculated as the metal and included as triphenyl phosphite.

6. A heat stabilized plasticized suspension polymerized poly (vinyl chloride) homopolymer resin containing in intimate admixture therewith from about 0.01 to 3 parts per 100 parts of resin of an alkali metal salt of a compound having the general formula:

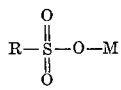

in which M is an alkali metal, and R is selected from the group consisting of alkyl, alkenyl, aryl, arylalkyl, aralkenyl, alkaryl, cycloalkyl, cycloalkenyl, alkoxy, aroxy, cycloalkoxy, alkaroxy, aralkoxy, aralkenoxy, 1,2-dicarboalkoxyethyl, carboxalkoxy alkali metal carboxyethyl, carboxyalkyl and metal carboxyalkyl; about 0.01 to about 5 parts per 100 parts resin of each of the metals calcium and zinc, each metal being present in the form of a salt of an organic monocarboxylic acid having 6 to 30 carbon atoms, and about 0.005 to about 0.5 part per 100 parts resin of phosphorus calculated as the metal and being present in the form of triphenyl phosphite.

7. A heat stabilized plasticized vinyl chloride homopolymer resin containing in intimate admixture therewith from about 0.01 to 0.05 part per 100 parts resin of the elements of calcium and zinc, from about 0.005 to 0.5 part 100 parts resin of phosphorus, about 0.01 to about 3 parts per 100 parts resin of an alkali metal alkyl sulfate, said calcium being included as calcium naphthenate, said zinc being included as zinc naphthenate, and said phosphorus being included as diphenyl monoisooctyl phosphite.

8. A composition of matter comprising a homopolymer of vinyl chloride, about 5 to 100 parts per 100 parts resin of di 2-ethylhexyl phthalate, about 0.01 to 0.5 part per 100 parts of resin of calcium calculated as the metal and present in the form of a salt of an organic monocarboxylic acid of 6–30 carbon atoms, 0.01 to 0.5 part per 100 parts resin of zinc calculated as the metal and present in the form of a zinc salt of an organic monocarboxylic acid of 6 to 30 carbon atoms, about 0.005 to 0.5 part per 100 parts resin of phosphorus, calculated as the metal and present in the form of an organic phosphite ester having the general formula:

where $R_1$ and $R_2$ are each selected from the group consisting of aryl, alkyl, cycloalkyl, alkaryl, aralkyl, alkoxyaryl, alkoxyalkyl, aroxyalkyl, and alkoxycycloalkyl radicals containing at least 5 carbon atoms and R is selected from the group consisting of hydrogen and $R_1$ and $R_2$ radicals, and about 0.01 to 3 parts per 100 parts resin of sodium lauryl sulfate.

References Cited by the Examiner
UNITED STATES PATENTS

| | | | |
|---|---|---|---|
| 2,455,612 | 12/1948 | Schlattman | 260—45.75 |
| 2,482,048 | 9/1949 | Williams | 260—45.7 |
| 2,953,537 | 9/1960 | McBrien | 260—45.75 |
| 2,997,454 | 8/1961 | Leistner et al. | 260—45.75 |
| 3,057,831 | 10/1962 | Holdsworth | 260—23 XR |

LEON J. BERCOVITZ, *Primary Examiner.*

G. W. RAUCHFUSS, JR., *Assistant Examiner.*